(12) United States Patent
Sakurai et al.

(10) Patent No.: US 7,760,925 B2
(45) Date of Patent: Jul. 20, 2010

(54) METHOD FOR AUTOMATICALLY DETECTING DEGENERATED REGIONS IN STAINED THIN SECTION SLIDES

(75) Inventors: Yasuhisa Sakurai, Neyagawa (JP); Hideaki Hikawa, Neyagawa (JP); Shuuichi Taneda, Osaka (JP); Naomi Eguchi, Suita (JP)

(73) Assignees: Kurashiki Boseki Kabushiki Kaisha, Kurashiki-shi (JP); Osaka Bioscience Institute, Suita-shi (JP)

( * ) Notice: Subject to any disclaimer, the term of this patent is extended or adjusted under 35 U.S.C. 154(b) by 875 days.

(21) Appl. No.: 10/593,037

(22) PCT Filed: Mar. 16, 2005

(86) PCT No.: PCT/JP2005/004628

§ 371 (c)(1),
(2), (4) Date: Dec. 26, 2006

(87) PCT Pub. No.: WO2005/088281

PCT Pub. Date: Sep. 22, 2005

(65) Prior Publication Data

US 2008/0159603 A1 Jul. 3, 2008

(30) Foreign Application Priority Data

Mar. 16, 2004 (JP) .............................. 2004-074768

(51) Int. Cl.
*G06K 9/00* (2006.01)
(52) U.S. Cl. ....................................... 382/129; 382/128
(58) Field of Classification Search ......... 382/128–129, 382/167
See application file for complete search history.

(56) References Cited

U.S. PATENT DOCUMENTS 4,741,043 A * 4/1988 Bacus ......................... 382/129

FOREIGN PATENT DOCUMENTS

| JP | 60-79320 A | 5/1985 |
|---|---|---|
| JP | 63-501597 A | 6/1988 |
| JP | 4-307366 A | 10/1992 |
| JP | 2002-40022 A | 2/2002 |
| JP | 2003-295063 A | 10/2003 |
| JP | 2004-301629 A | 10/2004 |

* cited by examiner

OTHER PUBLICATIONS

Ichiro Hankawa, Kensa to Gijutsu, ISSN:0301-2611, vol. 29, No. 7, Jun. 2001. pp. 842-844.

*Primary Examiner*—Vu Le
*Assistant Examiner*—Amara Abdi
(74) *Attorney, Agent, or Firm*—Birch, Stewart, Kolasch & Birch, LLP

(57) ABSTRACT

In a method for automatically detecting degenerated regions in many stained thin section specimens (40), color region information is obtained on a degenerated region and on a non-degenerated region on image data of a standard specimen in a stained thin section slide. Next, color region information is obtained on a non-degenerated region on image data of a specimen. Next, the image data of the specimen is compared with the image data of the standard specimen to calculate a color correction quantity to match tone and brightness of the non-degenerated region in the specimen with the counterparts in the non-degenerated region in the standard specimen, and the image data of the specimen is corrected with the color correction quantity. Next, a degenerated region is extracted in the corrected image data of the specimen based on the color region information in the standard specimen.

6 Claims, 6 Drawing Sheets

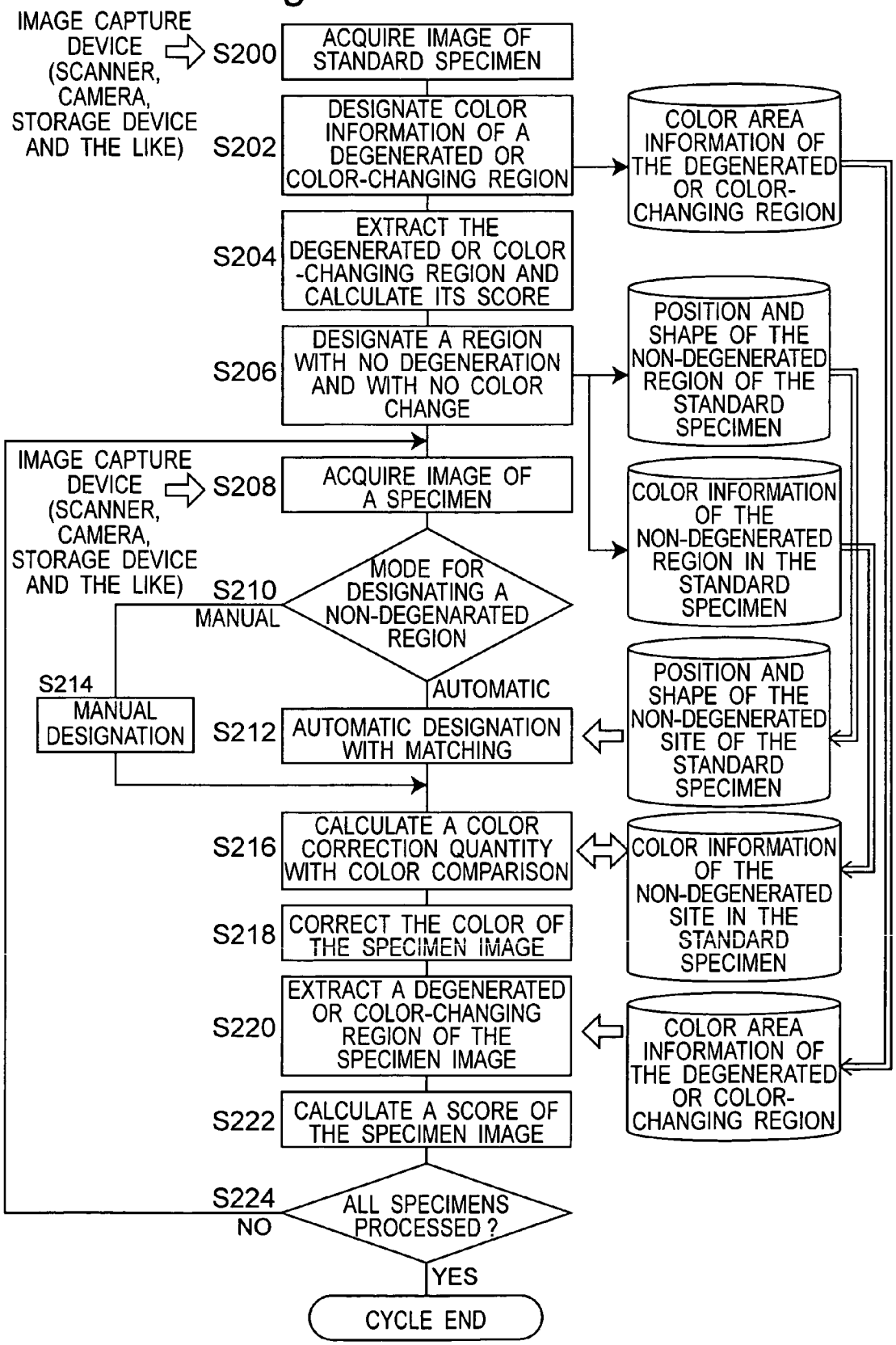

METHOD FOR AUTOMATICALLY DETECTING DEGENERATED REGIONS IN STAINED THIN SECTION SLIDES

TECHNICAL FIELD

The invention relates to search and detection of stained slice specimens such as thin section specimens of a biological object.

BACKGROUND ART

Degeneration and gene expression can be examined, identified or compared by observing degenerated regions in many stained thin section specimens such as thin section samples of an organic object. Only a microscope or the like is available as a tool for observing a microscopic area in thin section samples of an organic object or capturing an image thereof. A system for observation with a microscope is disclosed in Japanese Patent laid open Publication S60-79320/1985. A microscope disclosed in Japanese Patent laid open Publication 2003-295063 has a two-dimensional charge-coupled device (CCD) sensor and a linear sensor. An imaging area for the linear sensor is set by observing an image in an imaged area of the two-dimensional CCD sensor. Then, images are captured by shifting the position of the linear sensor successively in the imaging area, and the obtained images are synthesized.

In order to study tissues and immunology, it is necessary to search and image specified portions in many slides and to store the data. However, this job takes a long time. Then, in the above-mentioned prior art system described in Japanese Patent laid open Publication S60-79320, samples are supplied automatically by using a loader and an unloader.

However, when a microscopic area in a thin section sample of an organic object is observed, an apparent degenerated region and a non-degenerated area cannot be observed simultaneously in a limited field of view of a microscope. An image in a wide field of view can be obtained by synthesizing a series of successive images captured with a microscope. Because an observed area is narrow due to the limitation on view angle, it is necessary to synthesize the many images with a computer. However, there are problems. For example, the quality of the images is bad, and the synthesis process takes a long time. Further, because the illumination is not uniform within the field of view of the microscope, the obtained image is a mosaic with discontinuous tones or it has a low quality. Thus, it is difficult to process the images for comparison of the resultant entire image. Therefore, an automatic check and the like were difficult previously.

DISCLOSURE OF INVENTION

An object of the invention is to facilitate automatic detection of degenerated regions in many stained thin section specimens.

In a method for detecting a degenerated region according to the invention, (a) color region information on a degenerated region on image data of a standard specimen in a stained thin section slide is not obtained; (b) color region information on a non-degenerated region on the image data of the standard specimen is obtained. Next, (c) color region information on a non-degenerated region on image data of a specimen is obtained, and (d) the image data of the specimen is compared with the image data of the standard specimen to calculate a color correction quantity to match tone and brightness of the non-degenerated region in the specimen with the counterparts of the non-degenerated region in the standard specimen, and the image data of the specimen is corrected with the color correction quantity. Next, (e) a degenerated region is extracted in the corrected image data of the specimen based on the color region information of the degenerated region in the standard specimen.

Preferably, in the above-mentioned method, a score is calculated on the corrected image data of the specimen.

Preferably, in the above-mentioned method, a position and a shape of the non-degenerated region in the image data of the standard specimen are determined. Then, a non-degenerated region is designated in the specimen with a matching calculation based on data of the position and the shape of the non-degenerated region of the standard specimen.

An apparatus for detecting a degenerated region in a stained thin section specimen according to the invention has: (a) a first device which obtains color region information on a degenerated region on image data of a standard specimen in a stained thin section specimen; (b) a second processor which obtains color region information on a non-degenerated region on the image data of the standard specimen; (c) a third processor which obtains color region information on a non-degenerated region on image data of a specimen; (d) a color corrector which compares the image data of the specimen with the image data of the standard specimen to calculate a color correction quantity to match tone and brightness of the non-degenerated region in the specimen with the counterparts of the non-degenerated region in the standard specimen, and corrects the image data of the specimen with the color correction quantity; and (e) an extractor which extracts a degenerated region in the corrected image data of the specimen based on the color region information of the degenerated region in the standard specimen.

Preferably, the above-mentioned apparatus further has a scanner which acquires a series of images seamlessly on an entire specimen on the slide, and an automatic slide carrier which carries stocked slides one by one to the scanner and discharges and stocks the slides after the scan of the scanner.

Preferably, in the above-mentioned apparatus, the slide is held in a case having a side thickness larger than the slide.

The above-mentioned elements of the invention may be combined in various possible ways.

Thus, differences in slice thickness, stain density due to stain conditions and color density among the specimens are cancelled by matching tone and brightness of a non-degenerated region in the specimen with the counterparts of a non-degenerated region in the standard specimen. Thus, a quantitative difference among the specimens can be detected.

BRIEF DESCRIPTION OF DRAWINGS

FIG. 9 is a flowchart on image processing in an image processor.

BEST MODE FOR CARRYING OUT THE INVENTION

Figure 1:
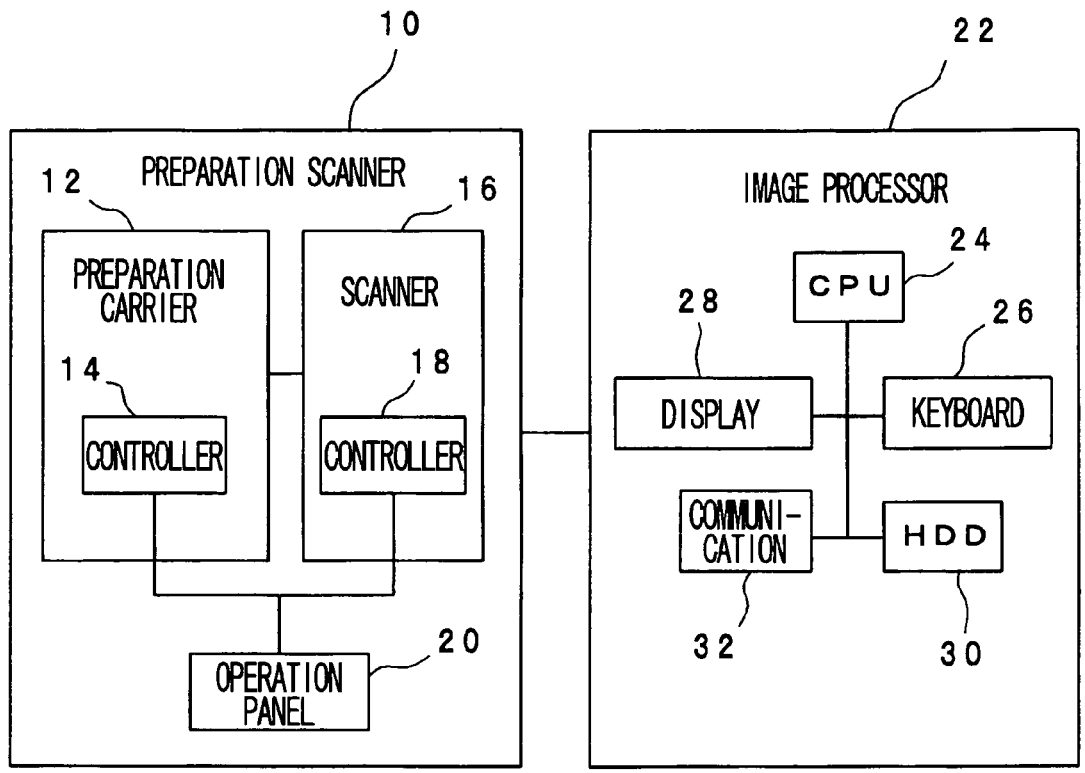
FIG. 1 is a block diagram of a system for checking a degenerated region.

Referring now to the drawings, wherein like reference characters designates like or corresponding parts throughout the several views, an embodiment of the invention is explained below.

In a system for automatically detecting a degenerated region, degenerated portions are observed on many stained thin section specimens, such as slice specimens of an organic object, and degeneration and gene expression are examined, identified or compared. By using this system, many samples can be analyzed exhaustively, as in a screening operation, and efficiently.

FIG. 1 shows the system for automatically detecting a degenerated area schematically. This system has a slide scanner 10 and an image processor 22, and it can handle slides continuously. The slide scanner 10 has a slide carrier 12 and a scanner 16. The slide carrier 12 is controlled by a controller 14 including a central processing unit (CPU). After slides are stocked, they are carried one by one to the scanner 16 automatically. The scanner 10 is controlled by a controller 18 including a CPU. The scanner 16 scans each slide carried to a scan position continuously. An image of a specimen on a slide is scanned with an image sensor such as R, G and B linear CCD sensors in a short time in a seamless way, and they are stored in a storage device. Thus, images of high quality of an entire specimen can be obtained. Because an entire slice of a tissue can be scanned at a time, the image of the entire slice can be provided with irregular colors. After the imaging is completed, the slide is returned to the slide carrier 12. An operator can input various instructions with an operation panel 20. The scanner 16 has a conventional image reading mechanism. Though not shown, a light source below the scan site illuminates the slide on the scan site, and the light transmitting the slide is guided through an optical system towards the image sensor. The electrical signal of the image sensor is converted to a digital signal and stored in the storage device.

The image processor 22 analyzes the image data obtained by the slide scanner 10. The image processor 22 has a configuration similar to a conventional computer, and it has a CPU 24 for controlling the entire image processor, a keyboard 26 as an input device, a display device for displaying images, a hard disk drive 30 as a storage device for storing image processing programs, image data and the like, and a communication device 32 for communication with the slide scanner 10. As will be explained later on the image data processing, brightness and color are matched among the imaged specimens in portions not degenerated or without degeneration or without gene expression (or in non-degenerated portions). Thus, differences in slice thickness, stain density due to stain conditions and color density among the specimens are cancelled. Next, the colors of degenerated regions are compared among the images in which brightness and color are matched in non-degenerated portions. Then, a quantitative difference among the specimens can be detected.

Figure 2:
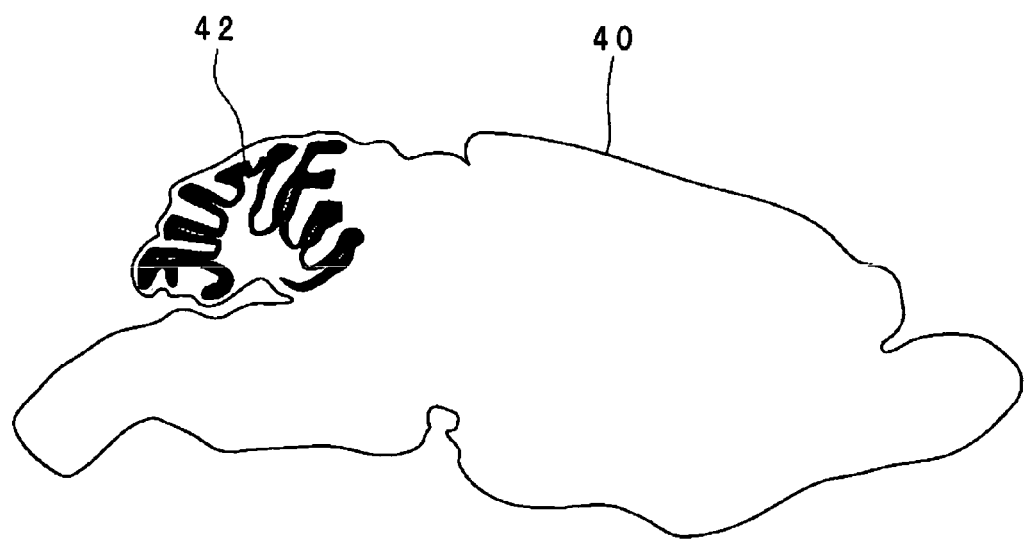
FIG. 2 is a diagram of an example of a thin section stained specimen.
Figure 3:
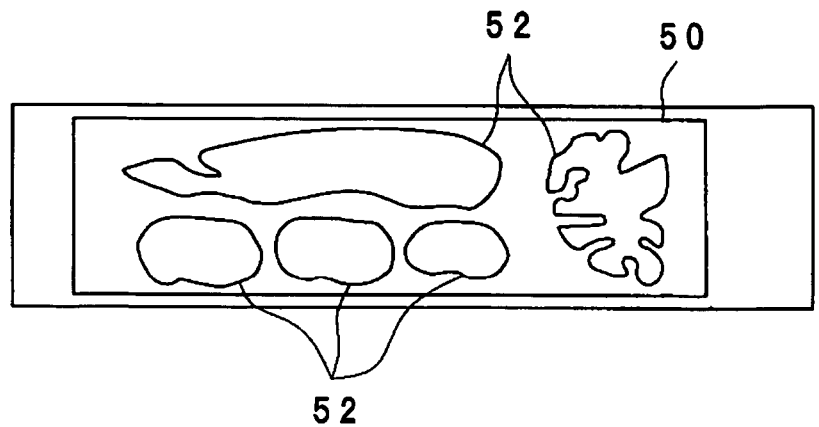
FIG. 3 is a diagram of an example of a slide having a plurality of specimens.

FIG. 2 shows an example of a thin section stained specimen. In the specimen 40, a dark degenerated region 42 is present in a region of light color. FIG. 3 shows specimens 52 randomly arranged on a slide 50. As shown in FIG. 3, the slice samples of an organic object, as materials to be imaged, do not have reproducibility on the shape.

Figure 4:
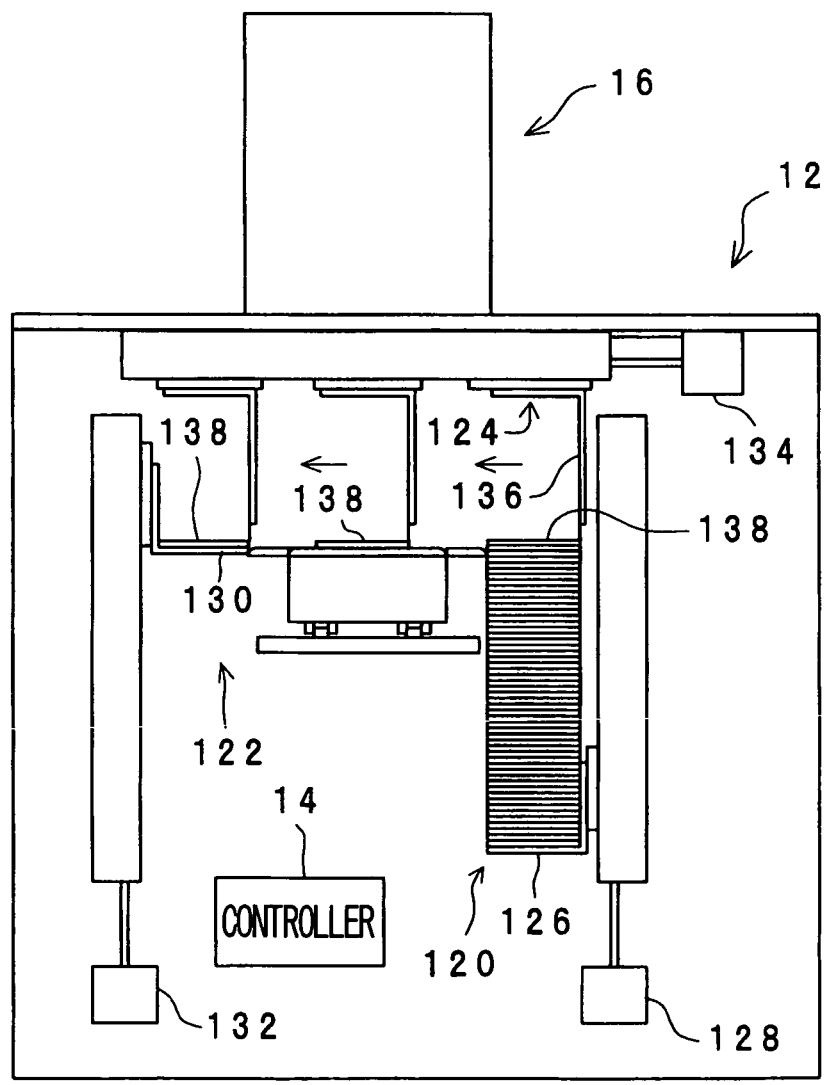
FIG. 4 is a diagram of a slide carrier in a slide scanner.

FIG. 4 shows a structure of the slide carrier schematically. The slide carrier 12 has a first stocker (loader) 120, a second stocker (unloader) 122 and a pusher 124. The stockers 120 and 122 can stock, for example, one hundred slides. In an example, slides 138 in a plastic case can be stocked in the stockers 120 and 122. The first stocker 120 has a supporter 126 on which many slides are laid vertically one by one. A screwed rotation axis (not shown) extending vertically can be rotated by a motor 128. The supporter 126 engaged with the screwed rotation axis is moved up and down by the motor 128. The pusher 124 is driven by a motor 134 in the right-and-left direction in FIG. 4, and a plate member 136 extending vertically pushes a slide 138 from the first stocker 120 to a stage at the top of a sliding table 15, and from the sliding table 15 to the second stocker 122. In FIG. 4, the pusher 124 is shown in three positions, that is, a position for moving a slide at the top of the first stocker 120, another position at which the slide has been moved on the stage, and a third position at which the slide has been moved at the top of the second stocker 122. The stage 15 can be moved from a supply position to a scan position and vice versa (or in a direction perpendicular to the paper sheet in FIG. 4) with a motor not shown.

Figure 5:
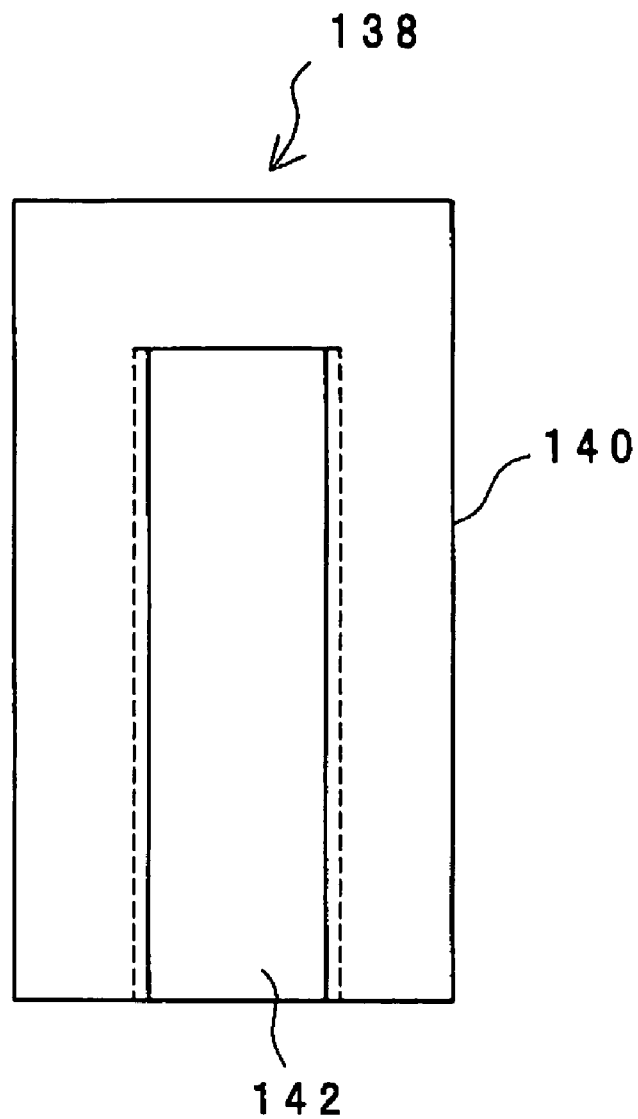
FIG. 5 is a plan view of a slide with a cover.
Figure 6:
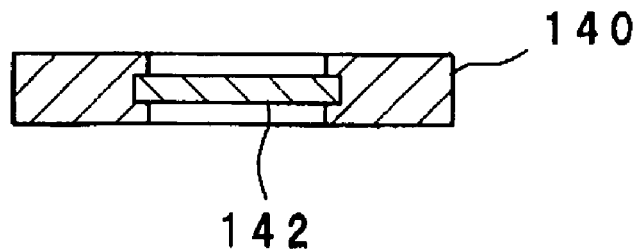
FIG. 6 is a sectional view of the slide.

FIGS. 5 and 6 are a plan view and a sectional view of a slide case 138 or a slide in a plastic case. If a gap between the plate member 136 of the pusher 124 and the table 14 is 0.5 mm, a high precision on positioning is needed for the operation of the pusher 124. Further, if such a slide is moved directly in a horizontal direction with the plate member 136 of the pusher 124, a stable operation is difficult. Therefore, a rectangular slide 142 is held in a rectangular plastic case 140. In the example shown in FIGS. 5 and 6, the plastic case 140 has a U-shape frame, and a groove is provided along the inner edge of the frame for accepting a rectangular slide 142. Thus, a slide 142 is engaged with the groove for holding it stably. Needless to say, a different mechanism for holding a slide may be used.

When the slide case explained above is used, the plate member 136 pushes the case 140 at a side thereof. Therefore, the thickness of the plastic case 140 is set to a value sufficient larger than the thickness of the gap between the plate member 136 and the sliding table 15, for example, about 2 mm. This is sufficiently large, so that the case 140 can be touched stably by the plate member 136.

In the above-mentioned slide scanner 10, after an operator puts slide cases 138 in the first stocker 120, the following operation is performed automatically.

(A) A slide in a slide case is carried from the stocker 120 onto the sliding table 15 automatically.

(B) The sliding table 15 is moved to the scan position, and an image or images of a specimen or specimens on the slide are captured. First, an entire slide is pre-scanned. Next, images of the specimens (images at specified positions) are scanned, and the captured image data are stored in the storage device.

(C) After the imaging is completed, the sliding table 15 is moved back to the supply position, and the slide case 138 is carried from the scanner 16 to the second stocker 122 and stocked therein.

Figure 7:
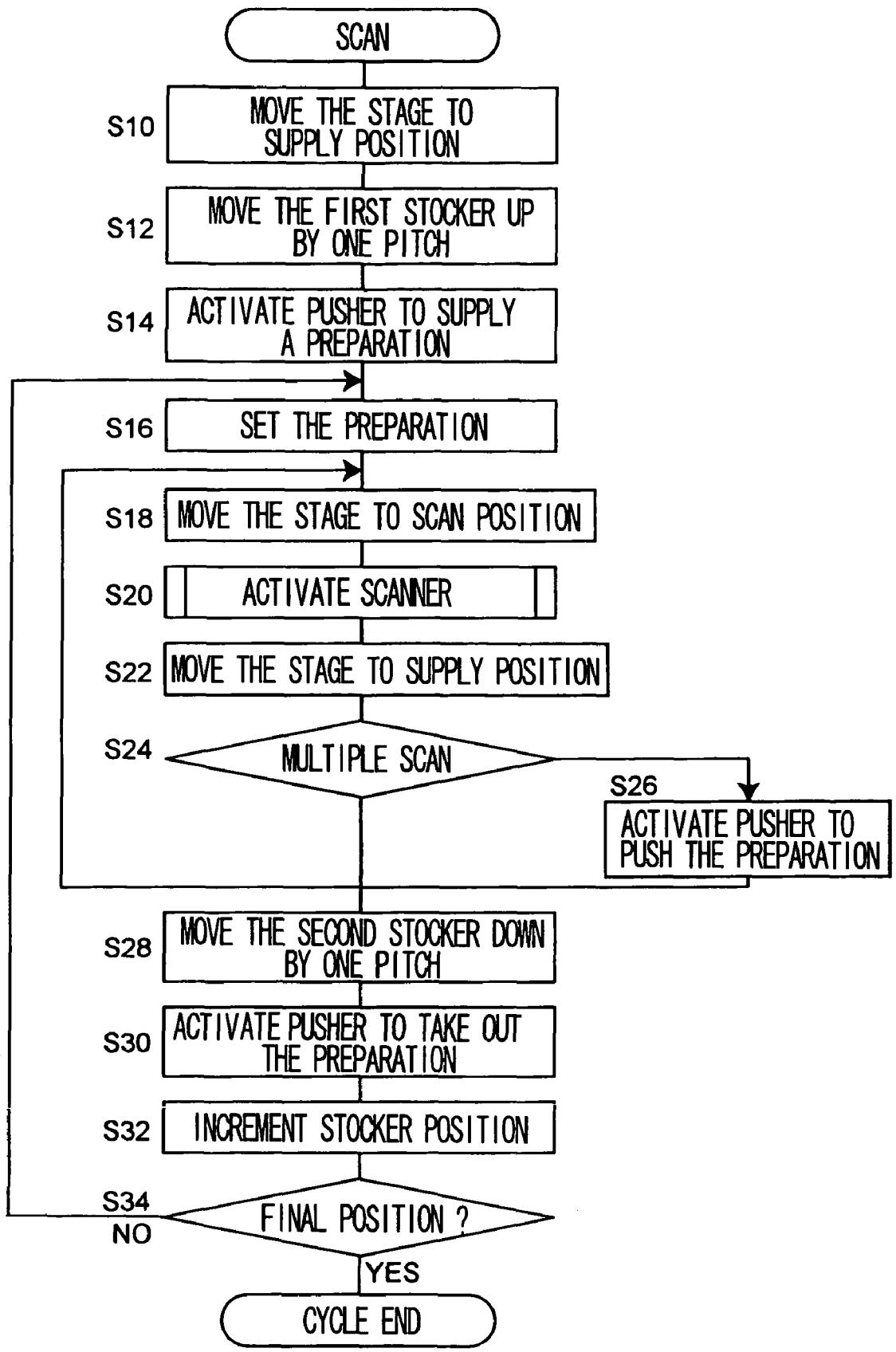
FIG. 7 is a flowchart for controlling the slide carrier in the slide scanner.

FIG. 7 shows a flowchart for controlling the carriage of slides by the controller 4 of the slide carrier 12. First, the sliding table 15 is moved to the supply position (S10). Next, the first stocker 120 is moved up by one pitch or by the thickness of a slide case (S12), so that the pusher 124 can touch a slide case. Next, the pusher 124 is controlled to supply the slide case (S14) so as to push a slide case at the top of the first stocker 120 to a predetermined position on the stage of the sliding table 15.

After the setting of the slide on the sliding table 15 is completed (S16), the slide is moved to the scan position (S18), or it is positioned at the scan position to be scanned by the scanner 16. Next, the scanner 16 is activated (S20). Thus, an image of a specimen or images of specimens are read.

After the scanning is completed, the stage (or the sliding table 15) is returned to the supply position (S22). Next, it is decided whether a multiple scan is performed or not (S24). In the case of a multiple scan, the pusher 124 is controlled to push the slide (S26) so as to shift the scan position on the slide. Then, the flow returns to step S18 for a next scan.

When it is decided that a multiple scan is not performed, the second stocker 122 is moved down by one pitch (S28). Next, the pusher 124 is controlled to take out the slide (S30), so as to push it from the stage of the sliding table 15 to the second stocker 122 to receive it. Then, the number of stocker position is increased by one (S32).

Next, it is decided whether the first stocker 120 is at the final position or not (S36). If the stocker 120 is decided not to be at the final position, the flow returns to step S18 for scanning a next slide. If the stocker 120 is decided to be at the final position, the carriage control is completed.

Figure 8:
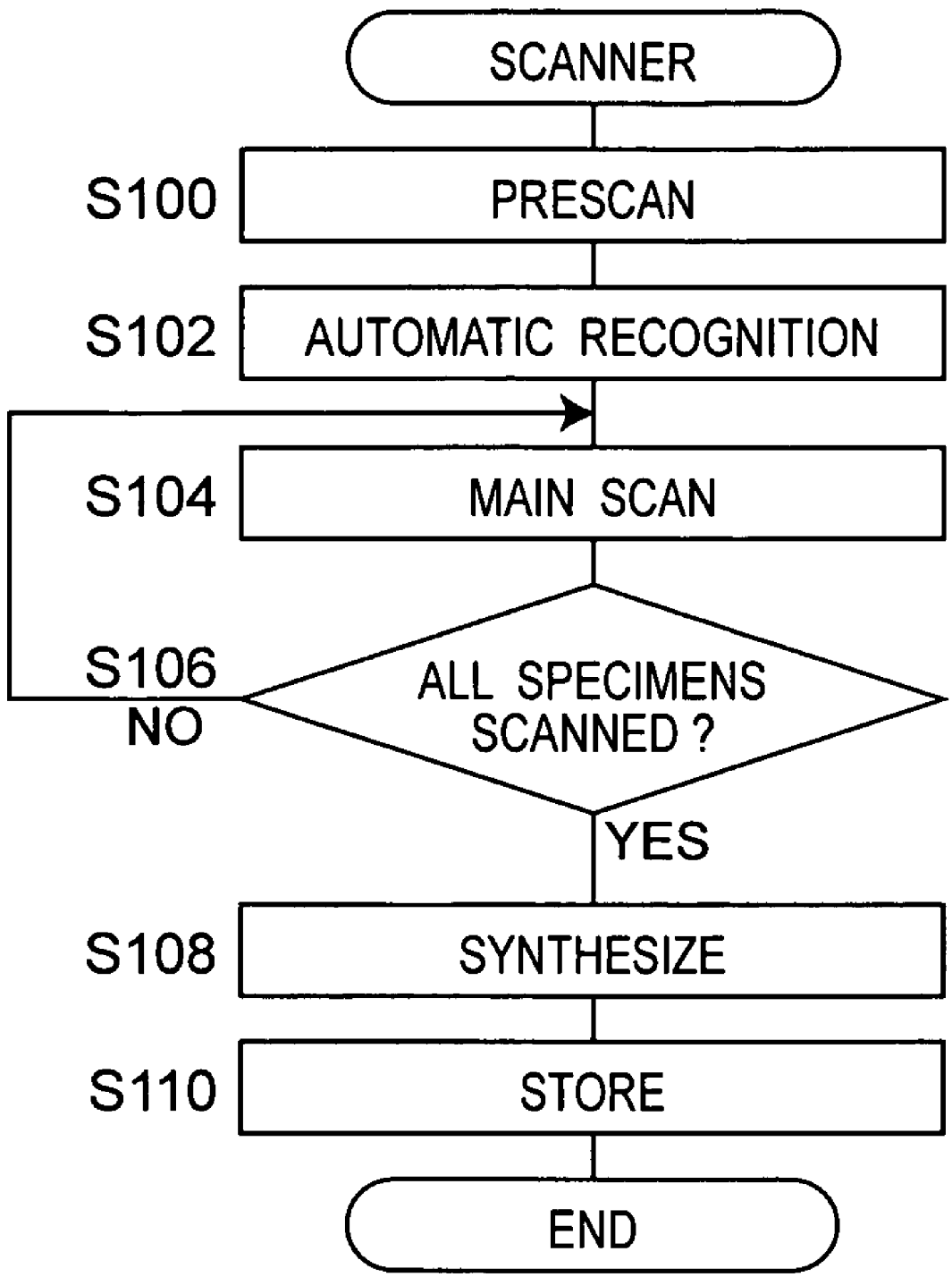
FIG. 8 is a flowchart for controlling a scanner in the slide scanner.

FIG. 8 shows a flowchart of the controller 18 in the scanner 16 for capturing an image. When a slide is put on the stage of the sliding table 15, a prescan for the slide is performed at a faster speed (or roughly) (S100), and a position of a specimen or positions of specimens on the slide are recognized automatically (S102). Next, a main scan (detailed scan) is performed based on the recognized position or positions (S104). For example, if the slide has specimens of tissue slices, it is scanned repetitively by the number of the specimens (S104 to S106). That is, after shifting the scan position on the slide, the flow returns to step S106 for restarting the main scan. This is repeated until the entire slides are scanned. Next, the image strips obtained in the main scans are synthesized to generate an entire specimen image (S108), and the synthesized image is stored in the storage device (for example in a disk) (S110). The images to be stored include an image of the entire slide (an image of low resolution obtained in a prescan), thumb nail images of the specimens (images of low resolution obtained in the prescan), and detailed images of the specimens (synthesized images).

FIG. 9 is a flowchart on image processing in the image processor 22. First, an image data of one of the specimens (or standard specimen) selected by an operator is read from the storage device (S200). The image data of the standard specimen has been obtained by the scanner 16 in this example. However, it may be an image data captured by a camera or the like or read from a storage device or the like. Next, a degenerated or color-changing region is designated by an operator, and color region information on the degenerated or color-changing region is stored according to the designation (S202). The color region information includes a color of the designated or color-changing region. Then, the degenerated or color-changing region is extracted in the standard specimen, and a score is calculated based on the color region information, and (S204). Teaching for the score calculation is performed at degenerated regions for calculating scores. In the teaching, an expression region is picked with a mouse, and similar color components are extracted. A simple image processing may be performed in order to emphasize the expression region. Next, when the operator designates a region or regions in the standard specimen where no degeneration or no gene expression is found (or non-degenerated region or regions), as a polygon or an ellipse with the operation panel 20, the position and shape and color region information are stored respectively for the non-degenerated regions (S206).

Next, images of specimens are read (S208). The specimen images have been obtained by the scanner 16. However, it may be an image data captured by a camera or the like or read from a storage device or the like. Then, the flow branches according to a mode for designating a non-degenerated region (S210). For automatic designation, a region or regions are designated automatically according the matching calculation (S212), while for manual designation, a region or regions are designated manually by the operator (S214). Next, by using the color information of the non-degenerated region in the standard specimen, the colors of non-degenerated regions are compared, and color correction data is calculated for matching tone and brightness of the non-degenerated regions among the specimens (S216). Thus, differences in slice thickness, the degree of stain due to staining conditions or in density are cancelled. Next, the colors of the specimen images are corrected by using the color correction data.

Next, a degenerated or color-changing region in the specimen image is extracted by using the color region information of the degenerated or color-changing region (S122). Then, a score of a specimen image is calculated (S124), wherein a tissue slice is divided into areas, and an expression is evaluated as a numerical value at each area. Based on the comparison of the scores, a quantitative difference among the specimens is detected.

Next, it is checked whether all the specimens are processed or not (S126). If not, the flow returns to step S208 in order to continue the processing of the specimen image data.

If the above-mentioned image processing is compared with visual examination for recognizing a degenerated portion with eye, the criterion for recognizing a degenerated portion is constant in the image processing invention. Then, a specimen stained entirely can be checked with the same criterion as a specimen stained partially. Therefore, a screening operation or the like can be performed quantitatively.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

The invention claimed is:

1. A method for detecting a degenerated region comprising:
   obtaining color region information on a degenerated region on image data of a standard specimen in a stained thin section slide;
   obtaining color region information on a non-degenerated region on the image data of the standard specimen;
   obtaining color region information on a non-degenerated region on image data of a specimen;
   comparing the image data of the specimen with the image data of the standard specimen to calculate a color correction quantity to match tone and brightness of the non-degenerated region in the specimen with the counterparts of the non-degenerated region in the standard specimen, and correcting the image data of the specimen with the color correction quantity; and
   extracting a degenerated region in the corrected image data of the specimen based on the color region information of the degenerated region in the standard specimen.

2. The method according to claim 1, further comprising the step of calculating a score on the corrected image data of the specimen.

3. The method according to claim 1, further comprising the steps of:
   determining a position and a shape of the non-degenerated region in the image data of the standard specimen; and
   designating a non-degenerated region in the specimen with a matching calculation based on data of the position and the shape of the non-degenerated region of the standard specimen.

4. An apparatus for detecting a degenerated region comprising:
- a first device which obtains color region information on a degenerated region on image data of a standard specimen in a stained thin section specimen;
- a second device which obtains color region information on a non-degenerated region on the image data of the standard specimen;
- a third device which obtains color region information on a non-degenerated region on image data of a specimen;
- a color corrector which compares the image data of the specimen with the image data of the standard specimen to calculate a color correction quantity to match tone and brightness of the non-degenerated region in the specimen with the counterparts of the non-degenerated region in the standard specimen, and corrects the image data of the specimen with the color correction quantity; and
- an extractor which extracts a degenerated region in the corrected image data of the specimen based on the color region information of the degenerated region in the standard specimen.

5. The apparatus according to claim 4, further comprising:
- a scanner which acquires a series of images seamlessly on an entire specimen on the slide; and
- an automatic slide carrier which carries stocked slides one by one to said scanner and discharges and stocks the slides after the scan of said scanner.

6. The apparatus according to claim 5, wherein the slide is held in a case having a side thickness larger than the slide.

* * * * *